(12) United States Patent
Cui et al.

(10) Patent No.: US 9,825,288 B2
(45) Date of Patent: Nov. 21, 2017

(54) METHOD FOR MAKING LITHIUM ION BATTERY ANODE ACTIVE MATERIAL

(71) Applicants: Jiangsu Huadong Institute of Li-ion Battery Co. Ltd., Zhangjiagang (CN); Tsinghua University, Beijing (CN)

(72) Inventors: Qing-Wei Cui, Beijing (CN); Jian-Jun Li, Beijing (CN); Xiang-Ming He, Beijing (CN); Jiang Cao, Beijing (CN); Li Wang, Beijing (CN); Zhong-Jia Dai, Beijing (CN)

(73) Assignees: Jiangsu Huadong Institute of Li-ion Battery Co. Ltd., Zhangjiagang (CN); Tsinghua University, Beijing (CN)

( * ) Notice: Subject to any disclaimer, the term of this patent is extended or adjusted under 35 U.S.C. 154(b) by 0 days.

(21) Appl. No.: 14/907,295

(22) PCT Filed: Jul. 2, 2014

(86) PCT No.: PCT/CN2014/081526
§ 371 (c)(1),
(2) Date: Jan. 25, 2016

(87) PCT Pub. No.: WO2015/010524
PCT Pub. Date: Jan. 29, 2015

(65) Prior Publication Data
US 2016/0164081 A1 Jun. 9, 2016

(30) Foreign Application Priority Data
Jul. 23, 2013 (CN) .......................... 2013 1 0310948

(51) Int. Cl.
*B05D 5/12* (2006.01)
*H01M 4/36* (2006.01)
(Continued)

(52) U.S. Cl.
CPC ......... *H01M 4/366* (2013.01); *H01M 4/0471* (2013.01); *H01M 4/134* (2013.01);
(Continued)

(58) Field of Classification Search
CPC combination set(s) only.
See application file for complete search history.

(56) References Cited

U.S. PATENT DOCUMENTS

| 5,700,616 | A  | * | 12/1997 | Kasuya | ............... | G03G 9/0819 |
| | | | | | | 430/108.23 |
| 2004/0106040 | A1 | * | 6/2004 | Fukuoka | ............. | H01M 4/0428 |
| | | | | | | 429/212 |

(Continued)

FOREIGN PATENT DOCUMENTS

| CN | 101847714 | 9/2010 |
| CN | 101850959 | 10/2010 |
| CN | 102376944 | 3/2012 |

*Primary Examiner* — Austin Murata

(57) ABSTRACT

A method for making a lithium ion battery anode active material comprising: providing silicon particles and a silane coupling agent, wherein the silane coupling agent comprises a hydrolysable functional group and an organic functional group; mixing the silicon particles and the silane coupling agent in water to obtain a first mixture; adding a monomer or oligomer to the first mixture to obtain a second mixture, the surfaces of the silicon particles being coated with a polymer layer by in situ polymerization method to obtain silicon polymer composite material, the monomer or the oligomer reacting with the organic functional group of the silane coupling agent in a polymerization, thereby a generated polymer layer being chemically grafted on the surfaces of the silicon particles; and heating the silicon polymer composite material to carbonize the polymer layer to form a carbon layer coated on the surfaces of the silicon particles.

13 Claims, 8 Drawing Sheets

(51) Int. Cl.
*H01M 4/04* (2006.01)
*H01M 4/134* (2010.01)
*H01M 4/1395* (2010.01)
*H01M 4/38* (2006.01)
*H01M 4/587* (2010.01)
*H01M 4/62* (2006.01)
*H01M 10/0525* (2010.01)

(52) U.S. Cl.
CPC ......... *H01M 4/1395* (2013.01); *H01M 4/386* (2013.01); *H01M 4/587* (2013.01); *H01M 4/625* (2013.01); *H01M 10/0525* (2013.01)

(56) References Cited

U.S. PATENT DOCUMENTS

| | | | |
|---|---|---|---|
| 2014/0050987 A1* | 2/2014 | Park | H01M 4/366 429/231.8 |
| 2014/0178700 A1* | 6/2014 | Iwase | B05D 1/36 428/447 |
| 2015/0064553 A1* | 3/2015 | Kono | H01M 4/622 429/217 |

* cited by examiner

METHOD FOR MAKING LITHIUM ION BATTERY ANODE ACTIVE MATERIAL

This application claims all benefits accruing under 35 U.S.C. §119 from China Patent Applications No. 201310310948.2, filed on Jul. 23, 2013 in the China Intellectual Property Office, the content of which is hereby incorporated by reference. This application is a 35 U.S.C. §371 national application of international patent application PCT/CN2014/081526 filed Jul. 2, 2014.

FIELD

The present disclosure relates to a method for making anode active material, and specifically relates to a method for making silicon-carbon composite material as the anode active material.

BACKGROUND

Graphite as commercialized anode active material cannot meet the needs of the development of lithium ion batteries, because of its low theoretical specific capacity (372 mAh·$g^{-1}$) and poor high rate charge/discharge performance. The development of lithium ion batteries with high energy and large power are urgent to seek new anode having high capacity, long life, and good safety performance to substitute conventional carbonaceous anode formed by graphite material.

Silicon anode material has been investigated as a promising high capacity anode material, because of its high theoretical specific capacity, and low electric potential of $Li^+$ intercalation and deintercalation. Reversible intercalation of lithium in the silicon is about 4000 mAh/g. But silicon material has a large volume change (volume expansion greater than 300%) in $Li^+$ intercalation and deintercalation process, leading a rapid capacity decrease and a poor cycle performance. Low conductivity and low first coulomb efficiency of the silicon material also restrict its practical application in the lithium ion batteries.

Nano-sized silicon particles is used as the silicon anode material in prior art, to reduce the volume change of the silicon anode material in Li+ intercalation and deintercalation process and improve structural stability and cycle performance of the silicon anode material. But the nano-sized silicon particles are easily agglomerated, which is unable to play the advantages of nanoparticles. In addition, carbon particles are coated on surface of the silicon anode material to improve the conductivity of the silicon anode material in prior art. But combination between the nano-sized silicon particles and the carbon particles is poor, and a plurality of the nano-sized silicon particles are easily agglomerated and directly in contact with each other, which results an uneven coating, and chemical electrical property of the silicon anode material can not be effectively improved.

SUMMARY

What is need is to provide a method for making the anode active material to improve cycle performance of the silicon anode material.

A method for making a lithium ion battery anode active material comprising: providing silicon particles and a silane coupling agent, wherein the silane coupling agent comprises a hydrolysable functional group and an organic functional group; mixing the silicon particles and the silane coupling agent in water to obtain a first mixture, the hydrolysable functional group of the silane coupling agent being hydrolyzed and chemically grafted on surfaces of the silicon particles; adding a monomer or oligomer to the first mixture to obtain a second mixture, the surfaces of the silicon particles being coated with a polymer layer by in situ polymerization method to obtain silicon polymer composite material, the monomer or the oligomer reacting with the organic functional group of the silane coupling agent in a polymerization, thereby a generated polymer layer being chemically grafted on the surfaces of the silicon particles; and heating the silicon polymer composite material to carbonize the polymer layer to form a carbon layer coated on the surfaces of the silicon particles, thereby achieving silicon carbon composite material.

Compared to prior art, since the present disclosure using the silane coupling agent, inorganic silicon particles and the organic polymer are connected together by chemical bonds, and then silicon carbon composite material formed after carbonizing the polymer has a core-shell structure. Since the polymer and the silicon particles are connected by chemical bonds, the carbon layer of the silicon carbon composite material is a continuous layer, uniformly and closely coated on the surfaces of silicon particles. Thus on one hand the conductivity of silicon particles can be improved, on the other hand the silicon particles are connected with each other by carbon to avoid adhesion between the silicon particles. The cycling stability of the lithium ion battery can be improved by using the silicon carbon composite material as the anode active material of lithium ion battery.

DETAILED DESCRIPTION

A detailed description with drawings and embodiments is made to illustrate the method for making an anode active material of the present disclosure.

Figure 1:
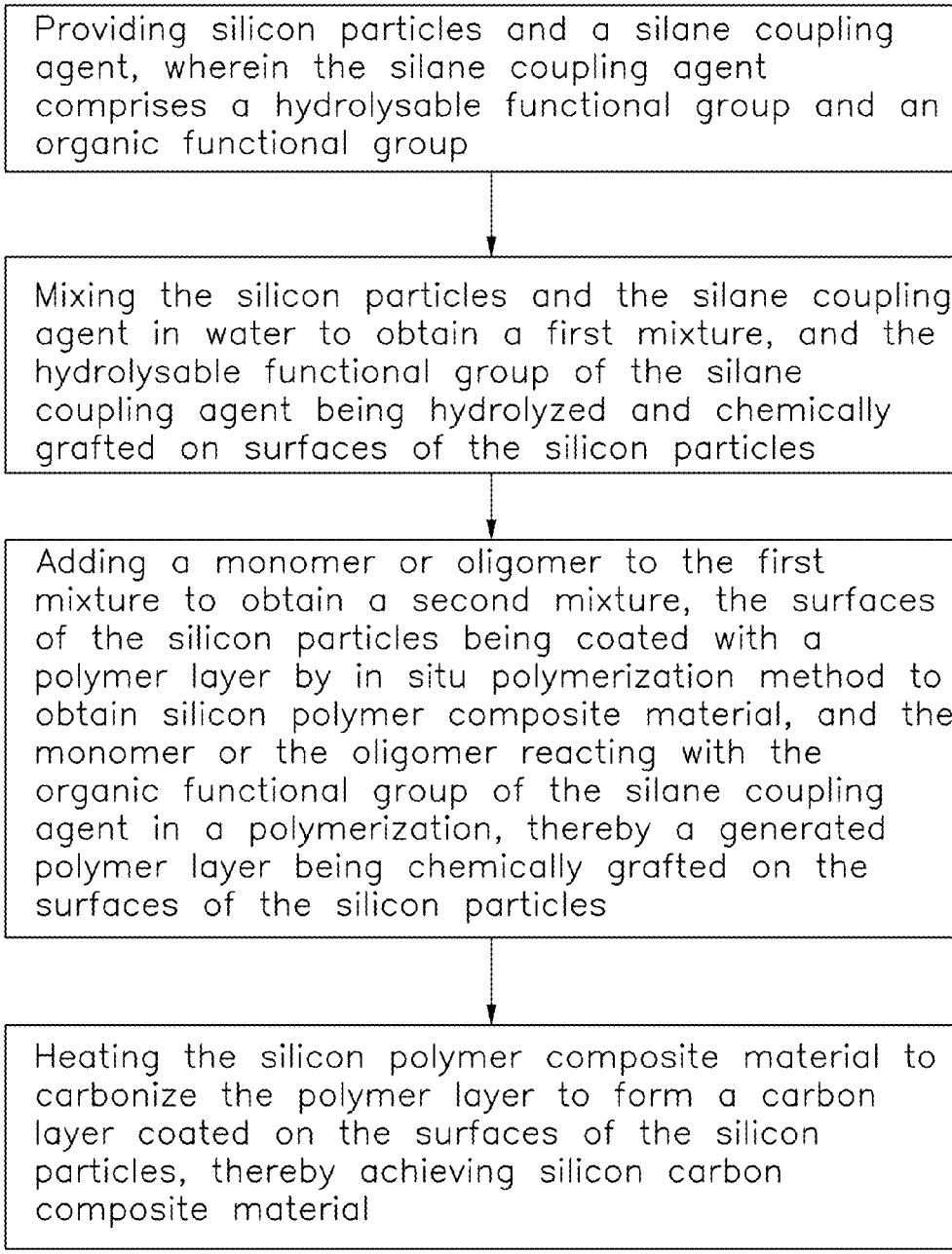
FIG. 1 is a flowchart of one embodiment of a method for making anode active material of lithium ion battery.

Referring to FIG. 1, the method for making the lithium ion battery anode active material of the present disclosure including steps of:

Step 1, providing silicon particles and a silane coupling agent, wherein the silane coupling agent comprises a hydrolysable functional group and an organic functional group;

Step 2, mixing the silicon particles and the silane coupling agent in water to obtain a first mixture, and the hydrolysable functional group of the silane coupling agent being hydrolyzed and chemically grafted on surfaces of the silicon particles;

Step 3, adding a monomer or oligomer to the first mixture to obtain a second mixture, the surfaces of the silicon particles being coated with a polymer layer by in situ polymerization method to obtain silicon polymer composite material, and the monomer or the oligomer reacting with the organic functional group of the silane coupling agent in a polymerization, thereby a generated polymer layer being chemically grafted on the surfaces of the silicon particles; and Step 4, heating the silicon polymer composite material to carbonize the polymer layer to form a carbon layer coated on the surfaces of the silicon particles, thereby achieving silicon carbon composite material.

In step 1, the silicon particles can be provided in any desired form such as powder, fiber, rod, tube or combinations thereof. A diameter of the silicon particles may be micronsized or nanosized. In one embodiment, the diameter of the silicon particles is in a range from about 1 nanometer to about 500 nanometers. In the present embodiment, the silicon particles are in the form of a powder having the diameter of about 100 nanometers.

The silane coupling agent is used as a connecting bridge between inorganic silicon particles and organic polymer. The silane coupling agent has the hydrolysable functional group that is used to join the silicon particles and the organic functional group that is used to join the polymer. The hydrolyzable functional group can be hydrolyzed in water and reacted with the surfaces of the silicon particles. The hydrolyzable functional group can be at least one of alkoxy groups, amino groups, oxime groups, aminoxy groups, carboxyl groups, alkenyl groups, and hydroxyl groups. The alkoxy groups comprise at least one of methoxy (—OCH$_3$) and ethoxy (—OCH$_2$CH$_3$) as examples. The amino groups comprise at least one of —NH$_2$, —NH—, —N= and —N(CH$_3$)$_2$ as examples. The oxime groups comprise —ON=C(CH$_3$)CH$_2$CH$_3$ as an example. The aminoxy groups comprise —ON(CH$_3$)$_2$ as an example. The carboxy groups comprise —OCOCH$_3$ as an example. In one embodiment, the hydrolyzable functional group can be at least one of the alkoxy groups, the alkenyl groups, the hydroxyl groups, diimide residues, substituted or unsubstituted acetamide residues, urea residues, carbamate residues, and amino sulfonic acid residues.

The organic functional group can react with the monomer and comprise an unsubstituted hydroxyl group or a substituted hydroxyl group. The unsubstituted hydroxyl group can be at least one of alkyl groups, cycloalkyl groups, alkenyl groups, aryl groups, and aralkyl groups. The substituted hydroxyl group is formed by substituting a portion or all of hydrogen atoms of the unsubstituted hydroxyl group. The hydrogen atom can be substituted by halogen atom, cyano group, oxyalkylene, polyoxyalkylene, (meth) acrylic group, (meth) acryloyloxy group, acryloyl group, methacryloyl group, amide group, urea group, or epoxy group. In one embodiment, the organic functional group has a C=C bond. In one embodiment, the organic functional group can be at least one of γ-glycidoxypropyl, β-(3,4-epoxycyclohexyl) ethyl, γ-aminopropyl, γ-cyanopropyl, γ-acryloyloxy propyl, γ-methacryloxy propyl, and γ-ureido propyl.

The silane coupling agent can be any kinds as long as allowing the silicon particles and the polymer be connected by chemical bonds. The silane coupling agent can be at least one of vinyltriethoxysilane, methyl trimethoxysilane, tetraethoxysilane, vinyl trimethoxy silane, methyl vinyl dimethyl silane, γ-methacryloxypropyl trimethoxy silane (KH570), methacryloxy propyl methyl dimethoxy silane (KH571), γ-aminopropyltriethoxysilane, γ-mercaptopropyl trimethoxysilane, γ-cyanopropyl trimethoxysilane, γ-glycidoxypropyl trimethoxysilane, β-(3,4-epoxycyclohexyl) ethyl trimethoxysilane, and γ-aminopropyltrimethoxysilane.

In step 2, since the silane coupling agent having the hydrolyzable functional group, therefore, when the silicon particles and the silane coupling agent are mixed in the water, the hydrolysable functional group are hydrolyzed and react with the silicon particles, and hydrolyzate of the silane coupling agent is chemically grafted on the surfaces of the silicon particles.

In step 2, mixing the silicon particles and the silane coupling agent in water to obtain the first mixture can comprise the steps of:

S21, adding the silicon particles into water to form a dispersion liquid;

S22, adding the silane coupling agent into the dispersion liquid to form the first mixture.

In step 21, the silicon particles are added to the water and uniformly dispersed to form the dispersion liquid, making the silane coupling agent uniformly react with the surfaces of the silicon particles. The silicon particles can be uniformly dispersed into the water by stirring or ultrasonic oscillation.

In step 21, an organic solvent can be further added into the water to form the dispersion liquid. The organic solvent can be miscible with the silane coupling agent. Thus the silicon particles and the silane coupling agent can be uniformly mixed and reacted with each other in the first mixture. In the present embodiment, firstly, the silicon particles are added and dispersed in a certain amount of the organic solvent, then water and another amount of the organic solvent are added to make the silicon particles uniformly dispersed in the first mixture.

The organic solvent can be ethanol, methanol, ether, isopropanol, toluene, or combinations thereof. In the present embodiment, the organic solvent is ethanol, the water is deionized water. The volume ratio of the water to the organic solvent can be in a range from about 1:2 to about 1:10. Within the volume ratio of the water and the organic solvent, the silane coupling agent and the silicon particles can be closely and uniformly combined. If the volume ratio of the water and the organic solvent is exceeded, the silane coupling agent itself tends to occur condensation, and cannot react with the hydroxyl group on the surfaces of the silicon particles.

The silicon particles can be etched to increase surface roughness of the silicon particles before the step S22. The silane coupling agent can be adhered and combined to the surfaces of silicon particles by increasing the surface roughness of the silicon particles. In the present embodiment, an acid is added in the dispersion liquid, such as hydrofluoric acid, to etch the silicon particles. The silicon particles are dispersed by ultrasonic oscillation after etching. A volume-to-mass ratio between the hydrofluoric acid and the silicon particles is in a range from about 0.9 ml/g to about 2 ml/g.

In step S22, the first mixture can be formed by directly adding the silane coupling agent to the dispersion liquid, or dispersing the silane coupling agent in the organic solvent firstly to form a mixture, and then adding the mixture to the dispersion liquid.

The silane coupling agent can be added drop by drop to the dispersion liquid, or added to the dispersion liquid by a small flow rate, so that the silane coupling agent can uniformly react with the surfaces of the silicon particles. The silane coupling agent can be added to the dispersion liquid at a rate in a range from about 0.2 ml/min to about 1 ml/min. In one embodiment, the silane coupling agent can be added to the dispersion liquid at a rate in a range from about 0.3 ml/min to about 0.5 ml/min. In the present embodiment, the silane coupling agent are added drop by drop to the dispersion liquid, and the silane coupling agent and the silicon particles are uniformly mixed by ultrasonic oscillation to form the first mixture. Since the first mixture comprises the water, the hydrolyzable functional group of the silane coupling agent can be hydrolyzed to form a group having silicon atom bonded to the hydroxyl (SiOH). And because of the high surface energy, the silicon particles can easily react with the water to generate the hydroxyl group on the surfaces. The hydroxyl group formed by the silane coupling agent is condensation reacted with the hydroxyl group on the surfaces of the silicon particles to form a Si—O—Si bond. The silicon particles and the hydrolyzate of the silane coupling agent are connected with each other by the Si—O—Si bond, so that the hydrolyzate of the silane coupling agent is chemically grafted on the surfaces of the silicon particles.

In step S22, the pH of the first mixture can be adjusted to maintain the first mixture in an acidic environment. Maintaining the first mixture in the acidic environment can control hydrolysis rate of the silane coupling agent and suppress the self-condensation reaction of hydrolysable silane coupling agent to allow the hydrolysable silane coupling agent chemically grafted on the surfaces of the silicon particles. Thus, it is able to coat the polymer layer on the surfaces of the silicon particles by in situ polymerization in the step 3. The pH value is in a range from about 3 to about 4. An acid can be added to the first mixture to maintain the first mixture at the acidic environment. The acid can be nitric acid, hydrochloric acid, acetic acid, or combinations thereof.

The mass percentage of the silane coupling agent in the first mixture is in a range from about 0.5 wt % to about 2 wt %. The mass ratio of the silicon particles to the silane coupling agent is in a range from about 0.1 to about 0.3.

In one embodiment of step S2, the mixing of the silicon particles and the silane coupling agent in water to obtain the first mixture comprises the steps of: adding the silane coupling agent to the water to form a hydrolysis solution of the silane coupling agent; and adding the silicon particles to the hydrolysis solution of the silane coupling agent to form the first mixture.

The hydrolyzate of the silane coupling agent can be better chemically grafted on the surfaces of the silicon particles, and the self-condensation reaction of the silane coupling agent can be weaken by forming the first mixture through steps S21 and S22.

In step S3, the polymer layer can be in situ coated on the surfaces of the silicon particles by polymerizing the monomer or oligomer to form a high polymer, after the hydrolysable functional group of the silane coupling agent is hydrolyzed and chemically grafted on the surfaces of the silicon particles. In one embodiment, the silicon particles can be added to the monomer solution or the oligomer solution after the hydrolysable functional group of the silane coupling agent being hydrolyzed and chemically grafted on the surfaces of the silicon particles, then an initiator is added to allow the silicon particles and the monomer solution or the oligomer solution react with each other and coat the polymer layer on the surfaces of the silicon particles. In this reaction, the monomer reacts with the organic functional group when the monomer itself has a polymerization, so that the polymer layer is chemically grafted and uniformly coated on the surfaces of the silicon particles to form the silicon polymer composite material by chemical bond. The binding force between the silicon particles and the polymer layer can be enhanced by the chemical bond.

In the present embodiment, the polymer layer can be coated on the surfaces of the silicon particles by following steps: adding the monomer and the initiator to the first mixture formed in step S22 and mixing uniformly to form a second mixture, the monomer is in situ polymerized on the surfaces of the silicon particles by the initiator, and meanwhile reacts with the organic functional group of the silane coupling agent to form the polymer layer chemically grafted on the surfaces of the silicon particles. In the present embodiment, the organic functional group have the C=C bond that is easy to open in the process of the in situ polymerization, monomer radical can be occurred in situ polymerization on the position of the opened C=C bond by the initiator, such that the surfaces of silicon particles can be coated with the polymer layer by chemically grafting. The formed polymer layer is chemically grafted on the surfaces of the silicon particles by the C=C bonds. A volume-to-mass ratio of the monomer to the silicon particles is in a range from about 3 ml/g to about 10 ml/g. A volume-to-mass ratio of the initiator agent to the monomer is in a range from about 0.01 ml/g to about 0.03 ml/g.

The monomer can be at least one of acrylonitrile, acrylic, and phenolic resin. The initiator can be selected according to the monomer. The initiator can be potassium persulfate, azobisisobutyronitrile, dibenzoyl peroxide or ammonium persulfate.

In step S3, the in situ polymerization can be carried out at a constant heating temperature. The heating temperature is set according to the polymer. In the present embodiment, the in-situ polymerization is carried out at a constant temperature by oil-bath heating.

The in situ polymerization can be carried out in an oxygen free environment. In the present embodiment, the in-situ polymerization is carried out in an inert atmosphere.

The silicon polymer composite material is a core-shell structure, the silicon particles are cores, and the polymer layer is shell. The polymer layer is uniformly continuous, and connected with the silicon particles by the chemical bonds. The dispersibility of the silicon particles can be improved by coating the polymer layer on the surfaces of the silicon particles.

The step S3 can further comprise a step to separate and purify the silicon polymer composite material. The silicon polymer composite material can be obtained by separating from the solvent by filtration, centrifugation or distillation, and then further drying.

In step S4, the silicon polymer composite material can be heated and carbonized by two steps. Firstly, the silicon polymer composite material is heated at about 100° C. to about 300° C., then the silicon polymer composite material is heated at about 600° C. to about 900° C. By the above two-step heating method, the carbon layer can be uniformly, continuously and closely coated on the surfaces of the silicon particles to form the silicon carbon composite material. The carbonization process of the polymer layer can be carried out under an inert atmosphere.

The silicon carbon composite material is a core-shell structure. The silicon particles are cores, the carbon layer is uniformly and continuously coated on the surfaces of the silicon particles. The conductivity and the structural stability of the silicon particles can be improved by coating the carbon layer. Further, the carbon layer may also prevent the silicon particles from oxidation and agglomeration at a high temperature.

The diameter of the silicon carbon composite material is in a range from about 300 nanometers to about 1 micron. The thickness of the carbon layer is in a range from about 10 nm to about 30 nm. A mass percentage of the carbon layer in the silicon particles is in a range from about 10 wt % to about 30 wt %.

Example 1

After 1.2 g of nano-silicon powders are dispersed in 100 ml of ethanol solution, 1.5 ml of hydrofluoric acid is added to etch the silicon powders for 2 hours. Then 50 ml of deionized water and 50 ml of ethanol solution are further added to the 100 ml of the ethanol solution in which the silicon powders dispersed to form a mixture. The mixture is ultrasonically agitated in an ultrasound magnetic crusher for 3 hours to form the dispersion liquid. 1 ml of vinyltriethoxysilane is added drop by drop to the dispersion liquid followed by ultrasonically agitated to form a first mixture. The first mixture is poured into a three mouth flask, and 1 ml of nitric acid is added to keep the first mixture in an acidic environment. 5 ml of acrylonitrile as the monomer and 0.05 g of benzoyl peroxide as the initiator are added to the first mixture to form a second mixture. The second mixture are heated at a constant temperature of 80° C. by oil-bath heating, the acrylonitrile has an in situ radical polymerization and forms a polyacrylonitrile layer coated on surfaces of the silicon powders after 12 hours, thereby forming silicon polyacrylonitrile composite material. The in situ polymerization is processed under a nitrogen atmosphere protection. The ethanol solution is removed by distillation. The silicon polyacrylonitrile composite material is dried for 2 hours at 80° C., grinded and dried. The mass of the obtained silicon polyacrylonitrile composite material is 3.46 g. Under the nitrogen atmosphere protection, the dried silicon polyacrylonitrile composite material is heated to 250° C. and kept for 2 hours, and then heated to 750° C. and kept for 6 hours, the polyacrylonitrile layer is carbonized, and an amorphous carbon layer is uniformly coated on the surfaces of the silicon powders to obtain the silicon carbon composite material. The mass of the silicon carbon composite material is 1.41 g. The obtained silicon carbon composite material is black.

Figure 2:
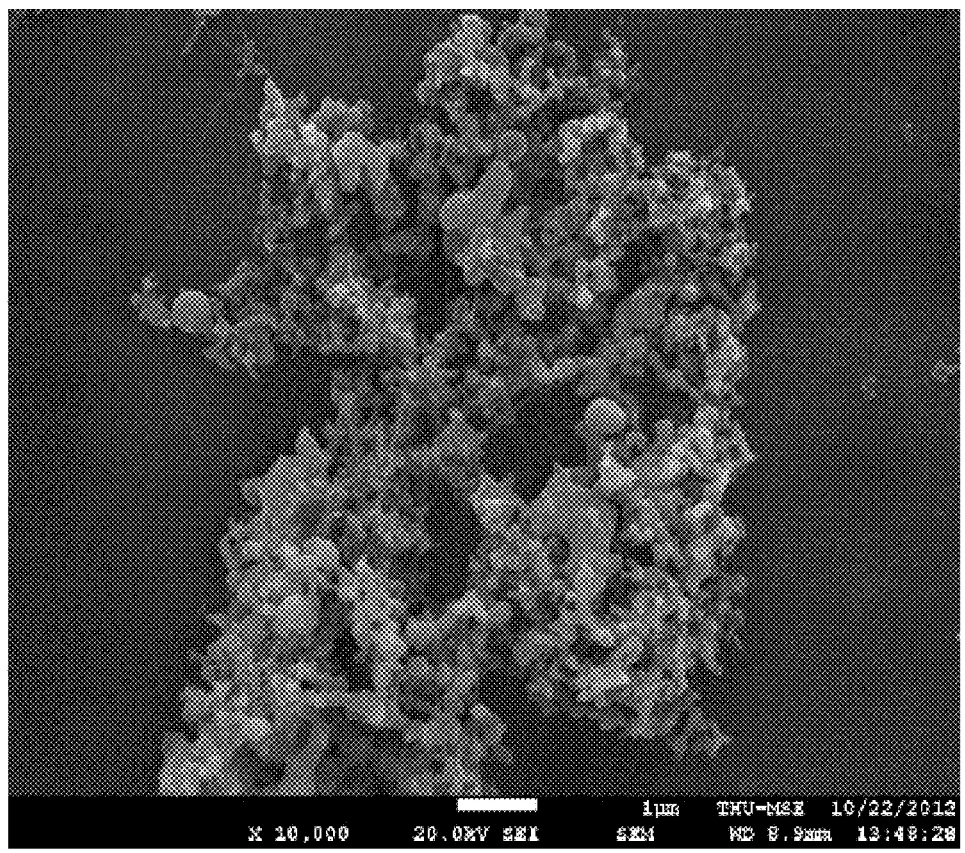
FIG. 2 is a scanning electron microscope (SEM) image of a raw material nano-silicon powders.
Figure 3:
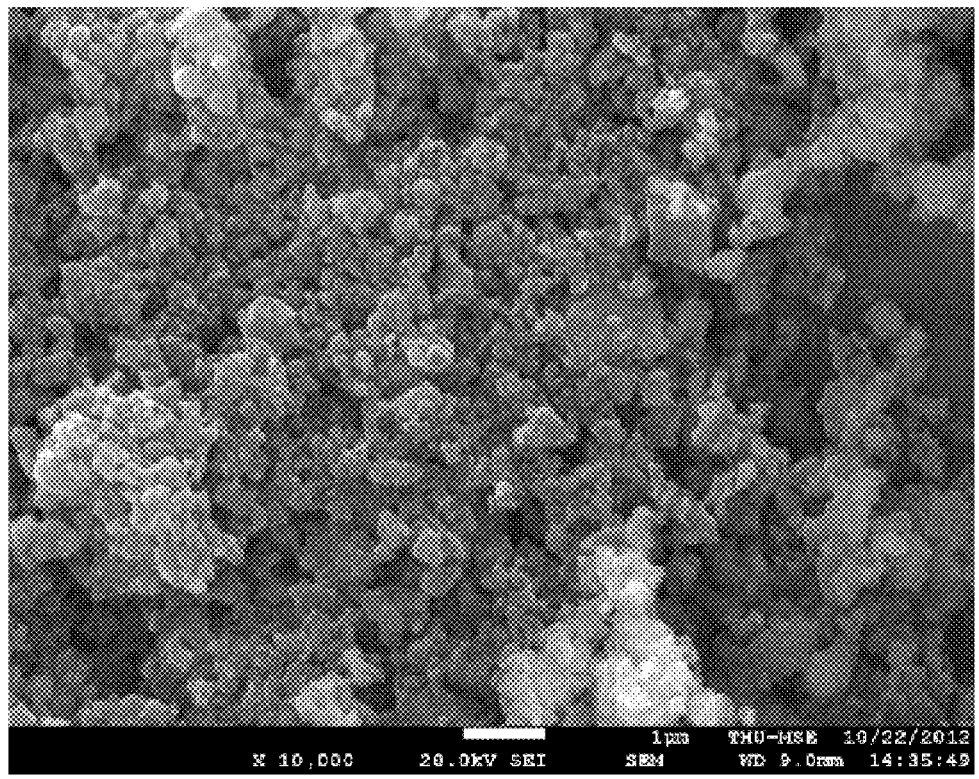
FIG. 3 is a SEM image of one embodiment of a silicon carbon composite material.

Referring to FIG. 2, the raw nanosized silicon powders are easily adhered with each other. Referring to FIG. 3, the grains of the silicon carbon composite material obtained from Example 1 are separated from each other, and a size of the silicon carbon composite material grains is larger than the raw nanosized silicon powders.

Figure 4:
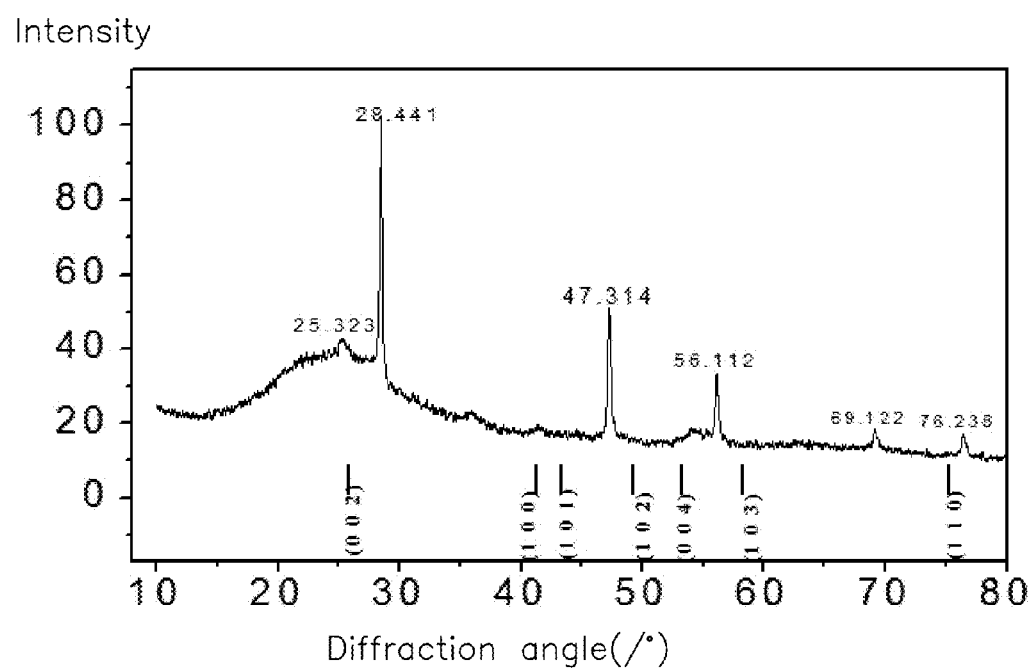
FIG. 4 shows X-ray diffraction (XRD) pattern of one embodiment of the silicon carbon composite material.

Referring to FIG. 4, the XRD pattern shows that the obtained silicon carbon composite material comprises crystalline silicon and amorphous phase (25.323) which represents graphite by analysis, indicating that the silicon carbon composite material consists of silicon and carbon.

Figure 5:
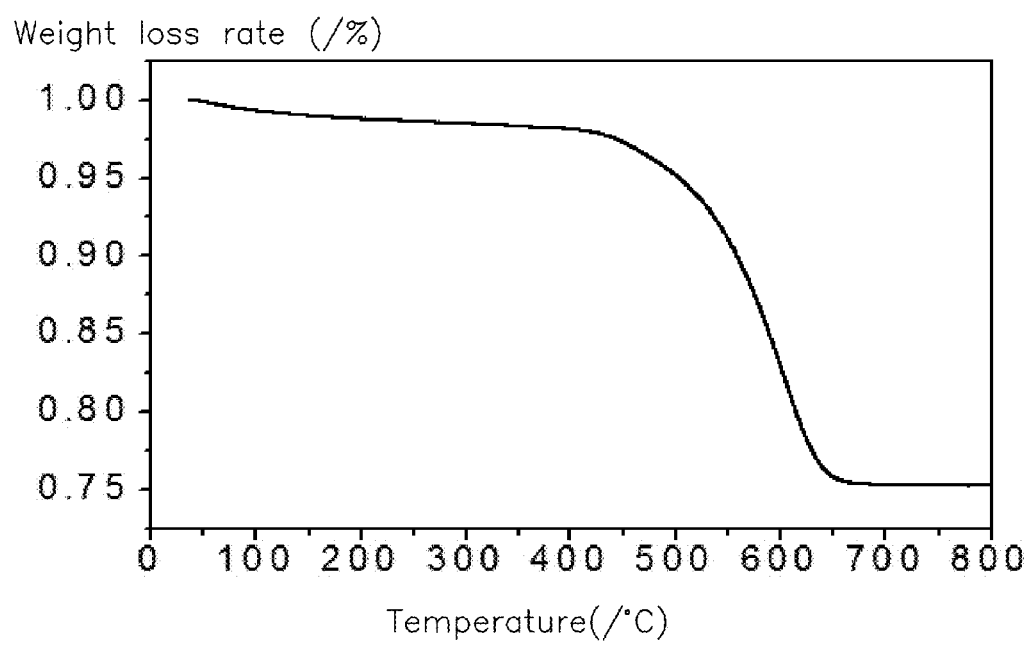
FIG. 5 shows a thermogravimetric analysis profile of carbon content in one embodiment of the silicon carbon composite material.

Referring to FIG. 5, measured by thermal gravimetric analysis, the mass percentage of the carbon layer in the nanosized silicon powders is 24 wt %.

In the present embodiment, the silicon carbon composite material is used as the anode active material to form a half cell of lithium ion battery, a lithium sheet is used as a counter electrode, wherein the mass ratio of the active material, acetylene black and binder is about 7:2:1. The electrochemical performance of the half cell is tested. The charge and discharge voltage of the half cell is about 0.005V to about 2V. The lithium-ion battery is cycled at a constant current of 26 mA/g.

Figure 6:
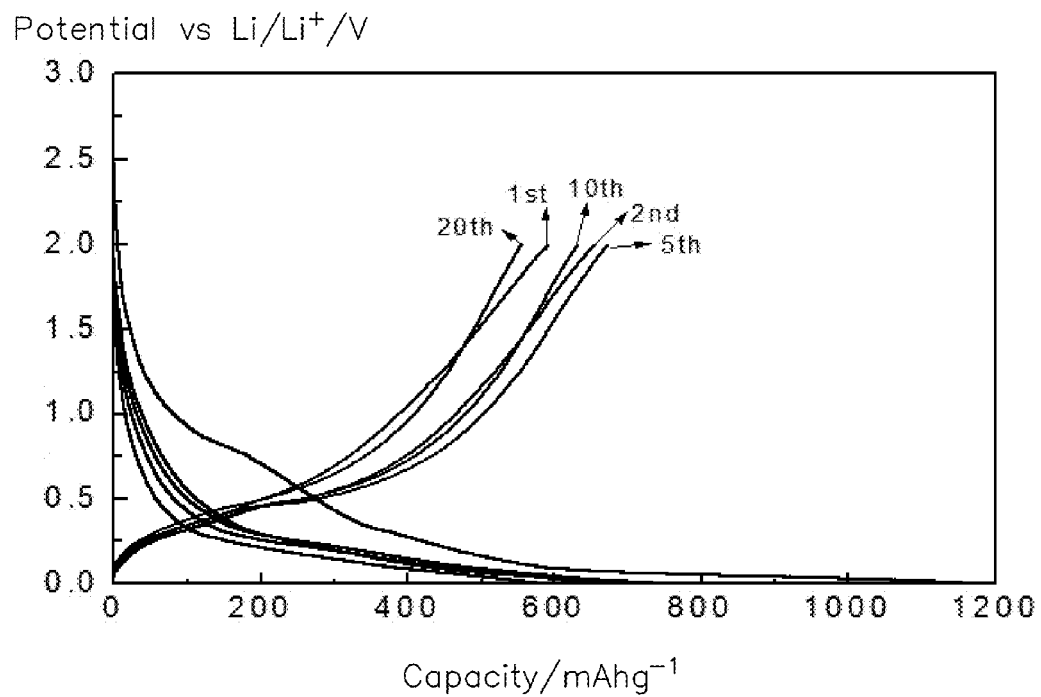
FIG. 6 shows charge-discharge curves of one embodiment of the silicon carbon composite material.
Figure 7:
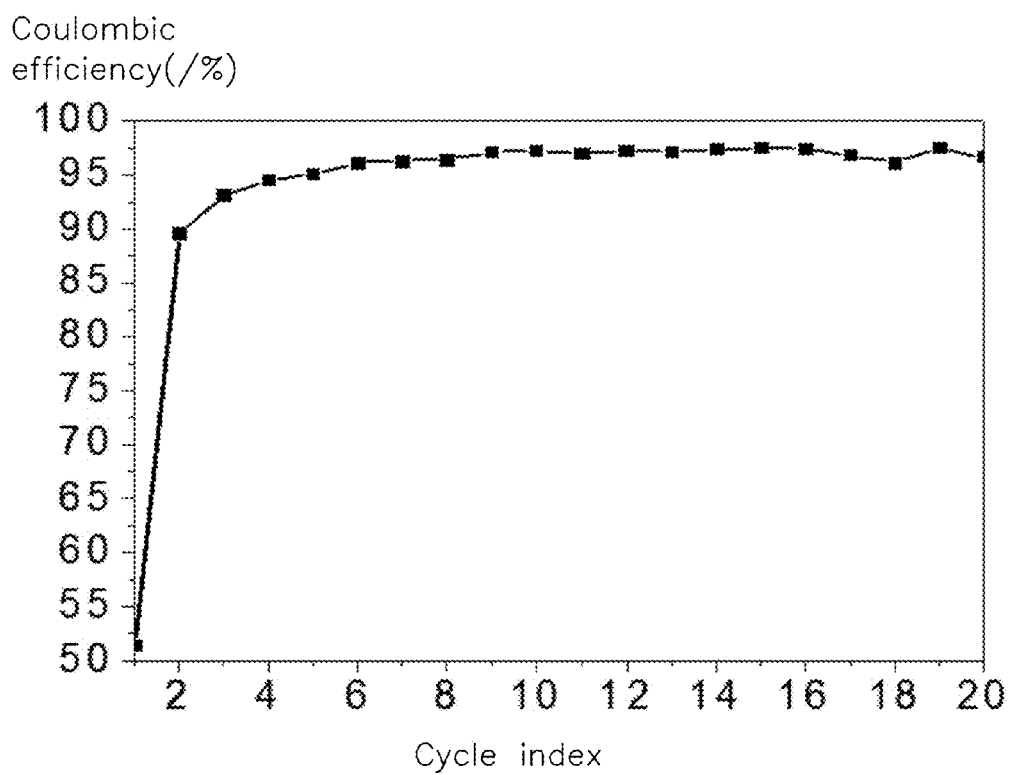
FIG. 7 shows a cycling performance of one embodiment of the silicon carbon composite material.

Referring to FIG. 6, an initial discharge capacity of the lithium ion battery can reach 1100 mAh/g, and a second discharge capacity can be more than 700 mAh/g. Referring to FIG. 7, the lithium ion battery has a relatively small capacity loss from $2^{nd}$ to $20^{th}$ cycle, and the coulomb efficiency can be maintained above 90%, indicating that the silicon carbon composite material as the anode electrode active material has a good cycling stability. In addition, the coulomb efficiency is above 90% within the next 40 cycles, and the capacity retention is 74.1% after 30 cycles.

Comparative Example 1

In the Comparative Example 1, the silicon particles and the polyacrylonitrile are directly mixed by ball milling, the polymer layer is formed on the surfaces of the silicon particles, then carbonized to form the silicon carbon composite material. The content ratio of the silicon particles and the polymer and other experimental conditions of the Comparative Example 1 are the same as in Example 1.

Figure 8:
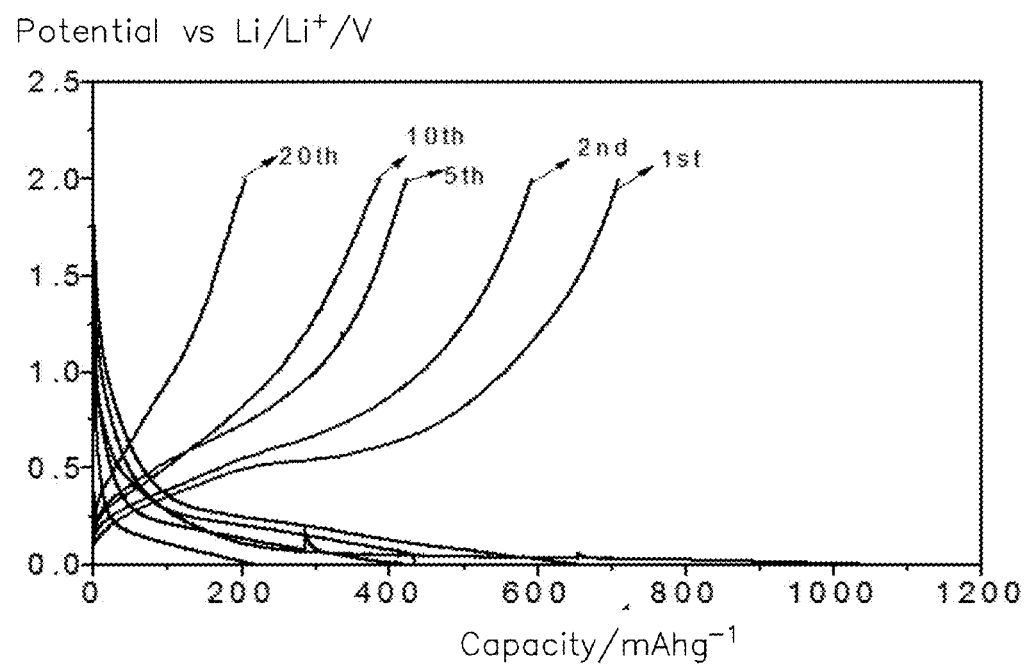
FIG. 8 shows charge and discharge curves of a silicon carbon composite material of Comparative Example 1.

The silicon carbon composite material obtained in the Comparative Example 1 is used to form a half cell. The electrochemical performance of half cell in the Comparative Example 1 is tested. Referring to FIG. 8, the first capacity of the half cell of the Comparative Example 1 is lower than the first capacity of the half cell of the Example 1. And after several cycles, the capacity of the half cell of the Comparative Example 1 decreases faster than the half cell of the Example 1.

Comparative Example 2

In the Comparative Example 2, the silicon particles and the acrylonitrile are directly mixed, and the initiator is added to allow the acrylonitrile in situ polymerized. Other experimental conditions are the same as in Example 1. It results that the polymer and the silicon particles can not be uniformly dispersed, and the polymer is difficult to coat on the surfaces of the silicon particles in the Comparative Example 2.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for making a lithium ion battery anode active material comprising:
providing silicon particles and a silane coupling agent, wherein the silane coupling agent comprises a hydrolysable functional group and an organic functional group;
mixing the silicon particles and the silane coupling agent in water to obtain a first mixture, the hydrolysable functional group of the silane coupling agent being hydrolyzed and chemically grafted on surfaces of the silicon particles;
adding a monomer comprising at least one of acrylonitrile and acrylic to the first mixture to obtain a second mixture;

in situ polymerizing the monomer to coat the surfaces of the silicon particles with a polymer layer to obtain a silicon polymer composite material, the monomer reacting with the organic functional group of the silane coupling agent in the in situ polymerizing, thereby chemically grafting the polymer layer on the surfaces of the silicon particles; and heating the silicon polymer composite material to carbonize the polymer layer to form a carbon layer coated on the surfaces of the silicon particles, thereby achieving silicon carbon composite material.

2. The method for making a lithium ion battery anode active material of claim 1, wherein a ratio of a volume of the monomer to a mass of the silicon particles is in a range from about 3 ml/g to about 10 ml/g.

3. The method for making a lithium ion battery anode active material of claim 1, wherein a thickness of the carbon layer is in a range from about 10 nm to about 30 nm.

4. The method for making a lithium ion battery anode active material of claim 1, wherein the heating comprises:
heating the silicon polymer composite material at a first temperature greater than or equal to 100° C. and less than 300° C.; and
further heating the silicon polymer composite material at a second temperature in a range from about 600° C. to about 900° C.

5. The method for making a lithium ion battery anode active material of claim 1, wherein the mixing the silicon particles and the silane coupling agent in water to obtain the first mixture, comprises:
adding the silicon particles into water to form a dispersion liquid; and
adding the silane coupling agent into the dispersion liquid to form the first mixture.

6. The method for making a lithium ion battery anode active material of claim 5, wherein an organic solvent is added into the water to form the dispersion liquid, the organic solvent is miscible with the silane coupling agent, and a volume ratio of the water to the organic solvent is in a range from about 1:2 to about 1:10.

7. The method for making a lithium ion battery anode active material of claim 6, wherein the organic solvent is selected from the group consisting of ethanol, methanol, ether, isopropanol, toluene, and combinations thereof.

8. The method for making a lithium ion battery anode active material of claim 5, wherein the silicon particles are etched by hydrofluoric acid before the silane coupling agent is added into the dispersion liquid, and a ratio of a volume of the hydrofluoric acid to a mass of the silicon particles is in a range from about 0.9 ml/g to about 2 ml/g.

9. The method for making a lithium ion battery anode active material of claim 5, wherein the silane coupling agent is added drop by drop to the dispersion liquid at a rate in a range from about 0.2 ml/min to about 1 ml/min.

10. The method for making a lithium ion battery anode active material of claim 5, wherein an acid is added to the first mixture to adjust the pH value and maintain the first mixture at an acidic environment, and the pH value is in a range from about 3 to about 4.

11. The method for making a lithium ion battery anode active material of claim 1, wherein a mass ratio of the silicon particles to the silane coupling agent is in a range from about 0.1 to about 0.3.

12. The method for making a lithium ion battery anode active material of claim 1, wherein the silane coupling agent is selected from the group consisting of vinyltriethoxysilane, methyl trimethoxysilane, tetraethoxysilane, vinyl trimethoxy silane, methyl vinyl dimethyl silane, γ-methacryloxypropyl trimethoxy silane (KH570), methacryloxy propyl methyl dimethoxy silane (KH571), γ-aminopropyltriethoxysilane, γ-mercaptopropyl trimethoxysilane, γ-cyanopropyl trimethoxysilane, γ-glycidoxypropyl trimethoxysilane, β-(3,4-epoxycyclohexyl) ethyl trimethoxysilane, γ-aminopropyltrimethoxysilane, and combinations thereof.

13. The method for making a lithium ion battery anode active material of claim 1, wherein the carbon layer is a continuous layer and uniformly coated on the surfaces of the silicon particles.

* * * * *